UNITED STATES PATENT OFFICE.

WALTER WEBER, OF DUSSELDORF, GERMANY, ASSIGNOR TO THE FIRM OF HENKEL & CIE., OF DUSSELDORF, GERMANY.

PROCESS OF MANUFACTURING PERBORATE OF ZINC.

1,121,428.  Specification of Letters Patent.  Patented Dec. 15, 1914.

No Drawing.  Application filed February 9, 1914.  Serial No. 817,699.

*To all whom it may concern:*

Be it known that I, WALTER WEBER, a citizen of the German Empire, and residing at Dusseldorf, Germany, have invented a certain new and useful Improved Process of Manufacturing Perborate of Zinc, of which the following is a specification.

My invention relates to the manufacture of perborate of zinc.

In my patent application Serial No. 817,698 filed February 9, 1914, I have described a process by which a magnesium perborate of good solubility and constant chemical composition can be made by melting a mixture composed of a magnesium salt and an alkali metal perborate. I have now found that perborate of zinc can be made by replacing the magnesium salt by the corresponding zinc salt.

Example: 1 molecular proportion of zinc sulfate $ZnSO_4.7H_2O$ is intimately mixed with 2 molecular proportions of sodium perborate $NaBO_3.4H_2O$, the mixture is melted at a temperature of about 70° C. on the water-bath and kept at this temperature for a considerable time while being stirred. On cooling, the mass congeals fairly rapidly, has a uniform crumbly appearance and can be very readily pulverized after being completely dried. The product obtained is a perfectly white amorphous powder of uniform composition.

The yield of active oxygen is almost quantitative in this process, and the new product is exceedingly stable.

As in the manufacture of magnesium perborate, the advantage of the herein described process of manufacturing perborate of zinc is its exceedingly great simplicity and short duration, as well as the resulting constant chemical composition of the final products.

In consequence of the combination of the high percentage of oxygen with the well-known action of the boracic acid and zinc compound, perborate of zinc is excellently adapted for pharmaceutical purposes.

I claim:—

1. A process of manufacturing perborate of zinc consisting in melting and simultaneously stirring an alkali metal perborate with a zinc salt whose anions are able to form with the alkali metal of the perborate, salts containing water of crystallization.

2. A process of manufacturing perborate of zinc consisting in melting sulfate of zinc with an alkali metal perborate while stirring the same.

3. A process of manufacturing perborate of zinc consisting in melting sodium perborate with a zinc salt whose anions are able to form with the alkali metal of the perborate, salts containing water of crystallization.

4. A process of manufacturing perborate of zinc consisting in melting zinc sulfate with sodium perborate while constantly stirring the same.

5. A process of manufacturing perborate of zinc consisting in mixing 2 molecular proportions of an alkali metal perborate with 1 molecular proportion of a zinc salt whose anions are able to form with the alkali perborate, salts containing water of crystallization, in melting the mixture at a temperature of from 65° to 70° C. and in maintaining it at this temperature for a time while stirring the same, and in then allowing the molten mixture to cool.

6. A process of manufacturing perborate of zinc consisting in mixing 1 molecular proportion of zinc sulfate with 2 molecular proportions of sodium perborate, in melting the mixture at a temperature of from 65° to 70° C. and in maintaining it at this temperature for a time while stirring the same, and in then allowing the molten mixture to cool.

In testimony whereof, I affix my signature in the presence of two witnesses.

WALTER WEBER. [L. S.]

Witnesses:
  HELEN NUFER,
  ALBERT NUFER.